United States Patent [19]

Dahmen et al.

[11] 4,286,004
[45] Aug. 25, 1981

[54] ANTISTATIC POLYURETHANE FOAMS AND CARPET BACKINGS MADE THEREFROM

[75] Inventors: Kurt Dahmen, Mönchen-Gladbach; Siegfried Pfabe, Geldern, both of Fed. Rep. of Germany

[73] Assignee: Chemische Fabrik, Stockhausen, Fed. Rep. of Germany

[21] Appl. No.: 147,694

[22] Filed: May 7, 1980

[30] Foreign Application Priority Data

May 17, 1979 [DE] Fed. Rep. of Germany ....... 2919975

[51] Int. Cl.$^3$ .................... C08G 18/14; B32B 27/18; B32B 27/40
[52] U.S. Cl. ...................... 428/95; 521/114; 260/DIG. 15; 528/48; 428/310
[58] Field of Search .......................... 521/114; 528/48; 428/310, 311; 260/DIG. 15

[56] References Cited

U.S. PATENT DOCUMENTS

| | | | |
|---|---|---|---|
| 3,701,796 | 10/1972 | Saaty et al. ...................... | 260/453 P |
| 3,746,573 | 7/1973 | Hotta et al. ...................... | 428/95 |
| 3,897,410 | 7/1975 | Olstowski et al. ............... | 528/48 |
| 3,955,022 | 5/1976 | Sands ............................. | 428/95 |
| 3,961,117 | 6/1976 | Kydonieus et al. .............. | 428/95 |
| 4,132,817 | 1/1979 | Tillotson ......................... | 428/95 |

FOREIGN PATENT DOCUMENTS 2529939 1/1977 Fed. Rep. of Germany .

OTHER PUBLICATIONS

Bobe et al., Chemiefasern/Textil-industrie, Oct. 1976, pp. 905-910.
Meilland Textilberichte 4, 1975, p. 314.
Neue Polyurethan-Teppichsbeschichtungs anlage von Fleissner, Chemiefasern/Textil-industrie, Mar. 1977, p. 250.
Hackh's Chemical Dictionary, 4th Ed., McGraw Hill, NY (1969), p. 16.
Saunders et al., Polyurethanes Part II, Inter Science, N.Y. (1964), p. 172.

*Primary Examiner*—H. S. Cockeram
*Attorney, Agent, or Firm*—Sprung, Felfe, Horn, Lynch & Kramer

[57] ABSTRACT

The present invention relates to rendering antistatic polyurethane foams, particularly polyurethane foams which are used as textile coating such as carpet backings. The antistatics are terminally esterified or etherified polyalkylene oxide adducts of the general formula

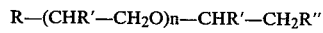

in which R and R'', which can be identical or different, denote a linear or branched alkoxy radical with 1 to 22 C atoms, an alkylaryloxy radical with 10 to 18 C atoms, an acyloxy radical with 1 to 18 C atoms or a halogen radical, R' denotes hydrogen or a methyl radical, and n denotes a whole number between 2 and 20. The antistatic finishing of the polyurethane foams is preferably effected by addition of the alkylene oxide adducts to the starting materials of the polyurethane foam. Preferably, the antistatic agents are dissolved in the diol component of the polyurethane. The so finished polyurethane foams have an antistatic content of 5 to 30 weight % relative to the polyurethane. The invention also extends to the antistatic finished polyurethane foams.

15 Claims, No Drawings

ANTISTATIC POLYURETHANE FOAMS AND CARPET BACKINGS MADE THEREFROM

The invention relates to rendering antistatic polyurethane foams, especially those used as carpet backings, using terminally esterified or etherified alkylene oxide adducts.

It is known that textile structures, particularly of synthetic material, tend to accumulate electrostatic charge at low humidity, as a consequence of which their use is considerably impaired. In particular, an electrostatic charge on carpets leads to sensitive functional interferences with electronic devices, e.g. in data processing installations, as well as to unpleasant discharge manifestations with living beings.

Numerous attempts have been made to develop fiber materials which, either by reason of the chemical composition of the fiber material or by the use of certain additives, have antistatic properties. To that effect, metal threads were spun into the fiber yarns.

It has been found, however, that even with a favorable surface structure of the textile structure as a result of optimal manufacturing conditions the antistatic effect is not sufficient per se even with a looped carpet material which, because of the continuous longitudinal direction of the antistatic yarn behaves more favorably with regard to electrostatic properties than a velour, due to the cutting and shearing of the pile yarns interrupting the run of the yarn with every loop. It is therefore, still necessary, particularly with velours, also to make the backing coating conductive.

According to the conventional methods used hitherto, coating compounds were used based on natural or synthetic latices, for which suitable antistatic additives are known. These compounds were essentially metal powders, conductive carbon blacks or water-soluble salts, partly in polymeric form, as described, for example, in German Patent Specification No. 2,529,939.

Both for technical and commercial reasons, there has been developed in the last few years a new coating process for rugs backed with polyurethane foam. Two methods are known so far:

1. The BAYER/Metzeler method which is described in MELLIAND Textile Reports 4, 1975, P. 314, and
2. the ICI-Fleissner method which is discussed in Chemiefasern/Textilindustrie March 1977, P. 250 MELLIAND Textilberichte 4, 1977, P. 335–336, Chemiefasern/Textilbericht October 1976, P. 905–910.

As reaction components, polyethers are preponderantly used as the diol component and toluylene diisocyanate (TDI) and diphenylmethane diisocyanate (MDI) are used as the isocyanate component.

Rugs coated with polyurethane foam according to the methods described are not antistatic, as seen from measurements of the electrical surface resistances according to DIN No. 54,345 at 25% relative humidity. Because of its poor conductivity, the polyurethane back acts, on the one hand, as an insulating layer between carpet an floor, and, even with optimal conductivity of the pile, prevents adequate grounding of the charge. On the other hand, because of the poor conductivity of the polyurethane foam, the amount of charge formed cannot be distributed even over a wide surface, particularly with velours, in order to reduce the resulting stresses. The values measured on polyurethane foam are $10^{13}$ to $10^{14}$ ohms. Even when using conductive fibers in the pile no adequate antistatic effect is achieved, since according to general opinion top and back should have surface resistances of $10^9$ to $10^{11}$ ohm if they are not to be objectionable in regard to the electrostatic behavior to textile bases (s. Pfabe, Deutscher Färber-Kalender 81, P. 336–348 (1977)).

Attempts to add to the polyurethane foam the conventional antistatics used in the customary latices have failed because these additives are incompatible with the polyurethane chemicals, especially the diisocyanates. To be sure, it is known from Vieweg and Höchtlen, Kunststoff-Handbuch, Vol, VII, Polyurethanes, Carl Hanser-Verlag, Munich, 1966, P. 741 to fill polyurethanes with certain types of carbon blacks to such an extent that the surface resistance is lowered and risk of electrostatic loading no longer exists. Nevertheless, about 30% of carbon black based on the solids content of the polyurethane is required for an effective reduction of the surface resistance. Besides an undesirable coloration—especially with light-colored carpet backings—such a high black content will also lead to adverse mechanical properties of the polyurethane foam.

An object of the invention is therefore to improve the electrical conductivity of polyurethane foams by antistatically effective additions that are compatible with the chemicals used for producing the polyurethane foams and that do not adversely affect the properties of the polyurethane foam and the textile material coated therewith.

The antistatics used according to the invention are to have a minimum of free hydroxyl groups so as not to interfere with the mechanism of polyurethane formation. Thus, the hydroxyl number should not exceed a value of 5. Also, the antistatics should be free of acids and bases so as not to impede the catalysis of the polyurethane reactions and to avoid undesired side reactions.

An important criterion is the water content of the antistatics used according to the invention. The products should generally contain no more than about 10% water by weight, and preferably be free of water altogether. Since in the production of polyurethane foams carbon dioxide is usually used as foaming agent, resulting from the reaction of water with isocyanate groups, the water content of the antistatics used in the total formulation must be taken into consideration in the preparation of the polyurethane foam.

Finally, the additions according to the invention should be easy to manage, preferably be liquid and soluble in the diol component—so that a uniform distribution during the foaming process is assured. The dissolution and homogeneous distribution of the antistatics in the diol component prior to the mixing of the polyurethane chemicals and subsequent foaming is the preferred kind of dosing.

The object of the invention is achieved by using an antistatic comprising a terminally esterified or etherified alkylene oxide adduct.

Specifically, the antistatic additive is a terminally esterified or etherified alkylene oxide adduct of the general formula $$R-(CHR'-CH_2O)_n-CHR'-CH_2R''$$

wherein

R and R″, which are identical or different, denote a linear or branched alkoxy radical with 1 to 22 C atoms, an alkaryloxy radical with 10 to 18 C atoms, an acyloxy radical with 1 to 18 C atoms, or a halogen radical, R' denotes hydrogen or a methyl radical, and n denotes a whole number between 2 and 20.

Compounds falling under the general formula constitute essentially polyalkylene oxide adducts whose terminal hydroxyl groups are etherified or esterified by suitable reaction measures so as to be rendered non-reactive with the isocyanate groups during the actual polyaddition reaction. They thus do not participate in the polyurethane formation and to that extent constitute inert additives.

When R stands for a linear or branched alkoxy radical it preferably has 1 to 18 C atoms, and more specifically 1 to 13 C atoms. If R and R" stand for a halogen radical, chlorine or bromine are preferred. Especially preferred are those compounds in which R and R' have these definitions while R" denotes a linear alkoxy radical with 1 to 4 C atoms, an acyloxy radical with 1 to 18 C atoms or a halogen radical, preferably chlorine or bromine. The number n of the alkylene oxide units is preferably 5 to 15 and, in case of ethylene oxide adducts, 5 to 10 units are especially preferred.

Surprisingly, it has been found that the antistatics used according to the invention do not adversely affect the mechanical and other physical properties of the polyurethane foams, but on the other hand considerably improve the electrical conductivity of the foams.

The antistatics used according to the invention are preferably added to the starting materials for the polyurethane foam, i.e. for homogeneous distribution the antistatics are preferably dissolved in the diol component before mixing of the diol component with the diisocyanate component and subsequent foaming. However it is also possible to add the antistatics to the diisocyanate, if sufficiently miscible or possible de-mixing through mechanical treatment is avoided. Depending on the method, all components can even be metered in individually.

In general, the concentration of the antistatics according to the invention is between about 5 and 30 weight % relative to the polyurethane. A preferred concentration for the antistatics is between about 10 and 20 weight % relative to the polyurethane. With the antistatics according to the invention it is, of course, possible to make antistatic polyurethane foams for all fields of use. Especially preferred, however, is the use of antistatics for polyurethane foams that are employed as coating compounds for carpet backings or for the coating of other textiles.

The additives of the general formula

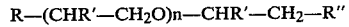
R—(CHR'—CH$_2$O)n—CHR'—CH$_2$—R"

and their preparation is known.

One way of preparing them for example, is to esterify polyethylene glycols with carboxylic acids, by the usual and known esterification methods. Linear as well as branched carboxylic acids with 1 to 18 C atoms can be used. Preferred, however, are lower carboxylic acids such as acetic acid, which, in turn, is preferably used in the form of its anhydride for the esterification.

The esterification can likewise be effected with inorganic acids, e.g. hydrogen halide. Preferably, however, thionyl chloride is used in the reaction for substitution of the hydroxyl group by e.g. chlorine.

The etherification of the polyalkylene oxide adducts with lower alkyl radicals is mainly effected by means of the known alkylation reagents such as methyl chloride, butyl chloride, dimethyl sulfate or diethyl sulfate.

On the other hand, it is possible first to prepare esterified or etherified polyalkylene oxide adducts by adding alkylene oxide to carboxylic acids, alcohols or alkyl phenols in known manner and then esterifying or etherifying the free hydroxyl group by known methods. The alcohols used according to this method can be linear or branched and contain 1 to 22 C atoms, alcohols with 1 to 18 C atoms, and particularly 1 to 13 C atoms, being generally preferred. As alkyl phenols, mainly the commercially available octyl and nonyl phenols are used, butyl and docecyl phenols being likewise used for this purpose. The carboxylic acids used according to this method are linear or branched and contain 1 to 18 C atoms.

The number of alkylene oxide units in the compounds of the general formula

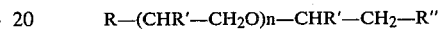
R—(CHR'—CH$_2$O)n—CHR'—CH$_2$—R"

can be 2 to 20, 5 to 15 alkylene oxide units being generally preferred. In the case of ethylene oxide adducts, 5 to 10 units are especially preferred. Ethoxylates or propoxylates are thus preferably used for forming the radical R'=H or —CH$_3$; a combination of ethylene oxide and propylene oxide radicals in the chain can likewise be used. It is of no consequence for the effectiveness of the reaction whether they are regularly arranged in the manner of a block copolymer or statistically distributed.

In the examples that follow there are described the production of polyurethane foams with the addition of antistatic agents according to the invention. The measurement of the electrical surface resistances of the foam materials according to DIN No. 54,345 shows the extraordinary improvement in conductivity of the additives as compared to untreated foams. Parts are by weight unless otherwise expressed.

EXAMPLE 1

The procedure for making a polyurethane foam according to the formulation 200.0 parts polyether, based on propylene oxide-ethyleneoxide, of a molecular weight of about 4000 and a hydroxyl number of 42

96.2 parts isomer mixture of 80% 2,4- and 20% 2,6-toluylene diisocyanate 7.6 parts water 0.4 parts triethylenediamine 0.8 parts tin dioctoate 2.1 parts polyalkylene glycol polysiloxane is as follows:

Into an upright paper container of 500 ml capacity, polyether polyol, water, amine and polyetherpolysiloxane are introduced and mixed with stirring. The stirrer used is a blade stirrer which should reach almost to the bottom of the container. Stirring is continued for 45 seconds at 2000 r.p.m., a minimum of air entering the liquid, stirring being continued for another 20 seconds. After that, the diisocyanate is quickly added and, after a further 7 seconds of stirring time, the mixture inside the container is rapidly poured into a mold lined with a polyethylene foil. Foam immediately starts to spread and fills out the mold. After about 2 minutes, the rise time is completed and the foam is left inside the mold in a heating chamber for one hour at 75° C., until it is no longer sticky. The block of foam freed from the foil is cut with a band saw into 1 cm wide disks which, after 72 hours of conditioning at 25% relative humidity and 23° C., are measured for electrical surface resistance according to DIN 54,345. The measured value is shown in the table hereinbelow.

EXAMPLES 2 THROUGH 20

According to the method described in Example 1, polyurethane foams are produced. Here, however, the antistatics A through K were added as indicated in the table. The cured foams were again cut into 1 cm wide disks on which, after conditioning, the surface resistances were measured.

The products had the following compositions:

| | |
|---|---|
| A, B, C, D: | Polyethylene glycols of average molecular weights 200, 300, 400 and 600 respectively whose terminal hydroxyl groups were esterified with acetic acid. The hydroxyl number of the products is <5, and the acid number <1. |
| E, F: | Monomethyl ethers and/or monobutyl ethers of a polyethylene glycol of an average molecular weight of 400, whose free hydroxyl groups were completely esterified with acetic acid; hydroxyl number <2, acid number <1. |
| G, H: | Polyethylene glycols of average molecular weights of 200 and 300 respectively whose free hydroxyl groups were completely replaced by chlorine. |
| I: | Nonyl phenol polyglycol ethers, containing 14 mols of ethylene oxide whose free hydroxyl groups were completely esterified with acetic acid. |
| K: | Alkyl polyglycol ethers from isotridecyl alcohol and 10 mols of ethylene oxide, whose free hydroxyl groups were completely esterified with acetic acid. |

TABLE

Surface resistances at 25% relative humidity and 23% C of polyurethane foams

| Example | Additive, wt. % on polyurethane | Additive | Surface resistance ohms |
|---|---|---|---|
| 1 | — | — | $10^{14}$ |
| 2 | 30 | A | $8 \times 10^{11}$ |
| 3 | 60 | A | $3 \times 10^{11}$ |
| 4 | 30 | B | $3 \times 10^{11}$ |
| 5 | 60 | B | $5 \times 10^{10}$ |
| 6 | 30 | C | $8 \times 10^{11}$ |
| 7 | 60 | C | $5 \times 10^{11}$ |
| 8 | 30 | D | $5 \times 10^{11}$ |
| 9 | 60 | D | $9 \times 10^{10}$ |
| 10 | 30 | E | $3 \times 10^{10}$ |
| 11 | 47 | F | $2 \times 10^{10}$ |
| 12 | 30 | F | $5 \times 10^{10}$ |
| 13 | 30 | G | $5 \times 10^{10}$ |
| 14 | 60 | G | $1 \times 10^{10}$ |
| 15 | 90 | G | $2 \times 10^{9}$ |
| 16 | 30 | H | $5 \times 10^{10}$ |
| 17 | 30 | I | $7 \times 10^{11}$ |
| 18 | 60 | J | $5 \times 10^{11}$ |
| 19 | 30 | K | $6 \times 10^{11}$ |
| 20 | 60 | K | $1 \times 10^{11}$ |

It will be appreciated that the instant specification and examples are set forth by way of illustration and not limitation, and that various modifications and changes may be made without departing from the spirit and scope of the present invention.

We claim:

1. A process for rendering antistatic polyurethane foams comprising incorporating in the foam in amounts of about 5–30 weight % based on the polyurethane an antistatic agent of the formula $$R-(RHR'-CH_2O)n-CHR'-CH_2R''$$

in which R and R'' each indepentently is a linear or branched alkoxy radical with 1 to 22 carbon atoms, an alkaryloxy radical with 10 to 18 carbon atoms, an aliphatic acyloxy radical with 1 to 18 carbon atoms, or a halogen radical, R' is hydrogen or a methyl radical, and n is a whole number from 2 to 20.

2. A process according to claim 1, wherein the antistatic agent is combined with a diol and diisocyanate component for producing the polyurethane foam.

3. A process according to claim 2, wherein the antistatic agent is added to the diol component before mixing the latter with the diisocyanate component.

4. A process according to claim 2, wherein the antistatic agent is dissolved in the diol component.

5. A process according to claim 1, wherein the antistatic agent is added to the diisocyanate component.

6. A process according to claim 1, wherein the diol component, the diisocyanate component and the antistatic component are simultaneously metered together.

7. A process according to claim 4, wherein the antistatic agent is employed in about 10 to 20 weight % based on the polyurethane, the foam being applied to a carpet back as formed to provide an antistatic foam backed carpet.

8. A polyurethane foam containing as an antistatic additive a terminally esterified or etherified polyalkylene oxide adduct of the general formula $$R-(CHR'-CH_2O)n-CHR'-CH_2R''$$

in which
R and R'' each independently is a linear or branched alkoxy radical with 1 to 22 carbon atoms, an alkaryloxy radical with 10 to 18 carbon atoms, an acyloxy radical with 1 to 18 carbon atoms, or a halogen radical,
R' is hydrogen or a methyl radical, and
n is a whole number from 2 to 20.

9. A polyurethane foam according to claim 8, wherein the antistatic additive is present in about 5 to 30 weight % based on the polyurethane.

10. A polyurethane foam according to claim 8, wherein the antistatic additive is present in about 10 to 20 weight % based on the polyurethane.

11. A polyurethane foam-backed carpet wherein the foam is that of claim 8.

12. A polyurethane foam-backed fabric wherein the foam is that of claim 8.

13. A fabric according to claim 12 wherein R and R'' are alkoxy with 1 to 22 carbon atoms.

14. A fabric according to claim 12 wherein R and R'' are acetoxy.

15. A fabric according to claim 12 wherein R and R'' are halogen.

* * * * *